UNITED STATES PATENT OFFICE 2,322,287

METHOD OF PRODUCING YEAST

Robert E. Eakin and Roger J. Williams, Corvallis, Oreg., assignors to Standard Brands Incorporated, New York, N. Y., a corporation of Delaware No Drawing. Application June 10, 1939,
Serial No. 278,408

5 Claims. (Cl. 195—82)

The invention relates to the growing of yeast, and to a suitable nutrient medium therefor. More particularly, it is concerned with a method for the propagation of yeast which is suitable for baking, and to a synthetic medium in which the yeast may be produced. Further, it includes correlated improvements and discoveries whereby the activity of yeast may be stimulated.

An object of the invention is to provide a method whereby the growth of a yeast may be augmented with an attending increase in yield.

A further object of the invention is the provision of a procedure for the propagation of yeast in a particular nutrient medium whereby yeast of good color and having good baking and keeping qualities may be produced.

An additional object of the invention is to provide a method in accordance with which the content of growth promoting substances or factors in a medium is augmented by the addition of vitamin $B_6$.

Other objects of the invention will in part be obvious and will in part appear hereinafter.

The invention accordingly comprises the several steps and the relation of one or more of such steps with respect to each of the others, and the nutrient medium possessing the features, properties and relation of constituents which are exemplified in the following detailed disclosure, and the scope of the invention will be indicated in the claims.

This invention is predicated upon the discovery that the growth or propagation of yeast may be facilitated, or its activity stimulated in a nutrient medium containing a carbohydrate material, nitrogen and phosphorus nutriments, including various inorganic salts, and with which vitamin $B_6$ is incorporated. The nutrient medium utilized is of especial composition, and is largely synthetic in character. To such a nutrient medium there may be added in small amounts the organic compound which has been variously designated as vitamin $B_6$ and adermin. This compound has been given the molecular formula $C_8H_{11}O_3N$ and the following probable structural formula:

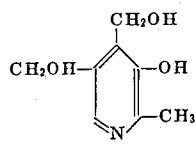

It thus appears to be 3.oxy-4.5 di(oxy methyl)-2-methyl-pyridine having a melting point of 159–160° C. We have found that when this compound is incorporated into the nutrient medium in minute concentrations, there results a marked stimulation in activity of the yeast, leading to a distinct increase in yield.

In this procedure utilization is made of Fleischmann's yeast taken from a marketed cake of said yeast. Furthermore, salts and other derivatives, as the sodium and potassium salts, the hydrochloride and the ethers of the pyridine which, under the conditions existing in the nutrient medium, would yield that compound or its salts, may be employed in lieu thereof. The nutrient medium contains requisite sugar, ammonia, phosphorus, lime, potash and magnesium compounds, together with small amounts of compounds containing thallium, zinc, manganese, boron, iron, copper and iodine.

More especially, the basal nutrient medium may be prepared such that one liter contains the following ingredients:

| | | |
|---|---|---|
| Cane sugar | grams | 20 |
| Ammonium sulfate | do | 3 |
| Potassium dihydrogen phosphate | do | 2 |
| Calcium chloride | do | 0.25 |
| Magnesium sulfate | do | 0.25 |
| Thallium chloride | mgs | 1.0 |
| Zinc sulfate | mgs | 1.0 |
| Manganese chloride | mgs | 1.0 |
| Boric acid | mgs | 1.0 |
| Ferric chloride | mgs | 0.5 |
| Copper sulfate | mgs | 0.1 |
| Potassium iodide | mgs | 0.1 |

As an illustrative embodiment of a manner in which the invention may be practiced, the following examples are given:

Example I

To a basal medium containing the nutriment materials hereinabove given, and in the amounts there stated, there may be added per liter 0.1 gram aspartic acid, 5 milligrams inositol, 15 micrograms concentrated calcium pantothenate, 25 micrograms crystalline thiamin, and 25 milligrams crude biotic acid. To this medium in 12 cc. portions, crystalline vitamin $B_6$ was added in amounts varying from 0.0005 to 1.0 microgram. Yeast was incorporated with the portions of the medium so prepared and the yeast grown or propagated therein at a temperature of about 30° C. At the end of about fourteen hours, the crop or yield of yeast in the various portions was determined.

Example II

Yeast was incorporated into portions of a nutrient medium having the same composition as set forth under Example I but containing 0.25 milligram of beta alanine per liter in place of the concentrated calcium pantothenate. These portions contain crystalline vitamin $B_6$ in the same amounts as Example I, and the stimulating effect was determined in like manner. The results obtained are presented in the following table:

| Amount of vitamin $B_6$ added (micrograms) | Example I | Yeast crop mgs. Example II |
|---|---|---|
| 0 | 3.41 | 4.47 |
| 0 | 3.37 | 4.53 |
| 0.0005 | 3.74 | 4.44 |
| 0.001 | 3.98 | 4.96 |
| 0.005 | 5.10 | 6.29 |
| 0.01 | 5.41 | 6.82 |
| 0.05 | 6.74 | 8.02 |
| 0.1 | 7.15 | 8.58 |
| 0.5 | 6.91 | 7.92 |
| 1.0 | 7.26 | 8.27 |

The foregoing procedures demonstrate that crystalline vitamin $B_6$, under the conditions presented and in the particular nutrient media has a distinctive stimulating effect upon the growth of yeast. The yields obtained in Example I show that the effect of crystalline vitamin $B_6$ is detectable when present in a concentration of 0.04 milligram per metric ton, and that the increase in yield may amount to 100% or more. While the amount of crystalline vitamin $B_6$ may be varied, we have found that excellent results accrue when the nutrient medium contains about one part of vitamin $B_6$ per million parts of the medium.

Preparation of the concentrated calcium pantothenate, which was approximately 50% pure, was effected by a fractionation procedure, which is described in detail in the Journal of the American Chemical Society, vol. 60 (1938) page 2719. The crude biotic acid was prepared from sheep liver, as follows: Fresh liver was allowed to autolyze 24 hours in the presence of two times its weight of water and $\frac{1}{10}$ its weight of benzene at 37° C. The resulting mixture was steamed to remove the benzene and bring about coagulation. The coagulum was filtered off and discarded. The resulting clear solution was shaken for 20 minutes with 3 percent of its weight of fuller's earth to remove basic substances, and then further treated at pH 5 with one percent of its weight of norite charcoal. Following these treatments, the solution was carefully evaporated to dryness in vacuum. The residue is termed "crude biotic acid," since it contains as an important active principle an acid substance to which the name "biotic acid" has been given. Biotic acid is characterized by having acid properties comparable with acetic acid, low molecular weight, about 150, and by being relatively easily oxidized and physiologically active when in the form of its methyl ester.

Since certain changes in carrying out the above process, and certain modifications in the nutrient medium which embody the invention may be made without departing from its scope, it is intended that all matter contained in the above description shall be interpreted as illustrative and not in a limiting sense.

Having described our invention, what we claim as new and desire to secure by Letters Patent is:

1. A method for stimulating the growth of yeast, which comprises preparing a nutrient medium containing a yeast assimilable carbohydrate, a yeast nutrient inorganic salt, aspartic acid, inositol, a member of the group consisting of calcium pantothenate and beta alanine, crystalline thiamin, biotic acid and vitamin $B_6$, incorporating yeast with said nutrient medium, and propagating the yeast therein, said vitamin $B_6$ acting to stimulate growth of the yeast.

2. A method for stimulating the growth of yeast, which comprises preparing a nutrient medium containing a yeast assimilable carbohydrate, a yeast nutrient inorganic salt, aspartic acid, inositol, a member of the group consisting of calcium pantothenate and beta alanine, crystalline thiamin, biotic acid and vitamin $B_6$, incorporating yeast with said nutrient medium, and propagating the yeast therein at a temperature of about 30° C., said vitamin $B_6$ acting to stimulate growth of the yeast.

3. A method for stimulating the growth of yeast, which comprises preparing a nutrient medium containing a yeast assimilable carbohydrate, a yeast nutrient inorganic salt, compounds containing the following elements, thallium, zinc, manganese, boron, iron, copper and iodine, aspartic acid, inositol, a member of the group consisting of calcium pantothenate and beta alanine, crystalline thiamin, biotic acid and vitamin $B_6$, incorporating yeast with said nutrient medium, and propagating the yeast therein, said vitamin $B_6$ acting to stimulate growth of the yeast.

4. A method of stimulating the activity of yeast, which comprises preparing a nutrient medium containing a yeast assimilable carbohydrate, a yeast nutrient inorganic salt, aspartic acid, inositol, a member of the group consisting of calcium pantothenate and beta alanine, crystalline thiamin, biotic acid and vitamin $B_6$, incorporating yeast with said nutrient medium, and allowing the yeast to act therein, said vitamin $B_6$ acting to stimulate the activity of the yeast.

5. A method for stimulating the activity of yeast, which comprises preparing a nutrient medium containing a yeast assimilable carbohydrate, a yeast nutrient inorganic salt, compounds containing the following elements—thallium, zinc, manganese, boron, iron, copper and iodine, aspartic acid, inositol, a member of the group consisting of calcium pantothenate and beta alanine, crystalline thiamin, biotic acid and vitamin $B_6$, incorporating yeast with said nutrient medium, and allowing the yeast to act therein, said vitamin $B_6$ acting to stimulate the activity of the yeast.

ROBERT E. EAKIN.
ROGER J. WILLIAMS.